United States Patent
Boucadair et al.

(10) Patent No.: US 12,218,955 B2
(45) Date of Patent: Feb. 4, 2025

(54) METHOD FOR ALLOCATING AN IDENTIFIER TO A CLIENT NODE, METHOD FOR RECORDING AN IDENTIFIER, CORRESPONDING DEVICE, CLIENT NODE, SERVER AND COMPUTER PROGRAMS

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 691 days.

(21) Appl. No.: 17/279,999

(22) PCT Filed: Sep. 26, 2019

(86) PCT No.: PCT/FR2019/052279
§ 371 (c)(1),
(2) Date: Mar. 25, 2021

(87) PCT Pub. No.: WO2020/065232
PCT Pub. Date: Apr. 2, 2020

(65) Prior Publication Data
US 2022/0038473 A1 Feb. 3, 2022

(30) Foreign Application Priority Data
Sep. 28, 2018 (FR) ...................................... 1859044

(51) Int. Cl.
*H04L 9/40* (2022.01)
(52) U.S. Cl.
CPC ...... *H04L 63/1416* (2013.01); *H04L 63/1425* (2013.01); *H04L 63/1458* (2013.01); *H04L 63/20* (2013.01)
(58) Field of Classification Search
CPC ............. H04L 63/1416; H04L 63/1425; H04L 63/1458; H04L 63/20
See application file for complete search history.

(56) References Cited

U.S. PATENT DOCUMENTS

| 9,756,075 B1* | 9/2017 | Gopalakrishna .... H04L 63/1425 |
| 2007/0149122 A1* | 6/2007 | Murphy ................. H04W 8/26 455/41.2 |

(Continued)

FOREIGN PATENT DOCUMENTS

| CN | 104618351 A | 5/2015 | |
| CN | 105610852 A | 5/2016 | |
| EP | 1655928 A1 * | 5/2006 | ....... H04L 29/12264 |

OTHER PUBLICATIONS

International Search Report dated Dec. 3, 2019 for corresponding International Application No. PCT/ FR2019/052279, Sep. 26, 2019.

(Continued)

*Primary Examiner* — Esther B. Henderson
(74) *Attorney, Agent, or Firm* — David D. Brush; Westman, Champlin & Koehler, P.A.

(57) ABSTRACT

A method for allocating an identifier to a first client node of a client domain, the first client node managing traffic associated with the client domain to protect it against a computing attack. The method includes: receiving a request for allocating a client node identifier from the first client node, the request including information identifying the client node; obtaining a list of client node identifiers already allocated to the client nodes active at least in the client domain; allocating to the first client node a client node identifier not belonging to the list obtained; recording in a local memory an association between the allocated identifier and the information; sending a response to the first client node, including the allocated identifier; and sending a request for recording the identifier allocated to the first client node in the domain to a traffic management server associated with the domain.

17 Claims, 7 Drawing Sheets

(56) References Cited

U.S. PATENT DOCUMENTS

| | | | |
|---|---|---|---|
| 2008/0161008 A1* | 7/2008 | Porat | H04W 12/06 |
| | | | 455/450 |
| 2013/0124717 A1* | 5/2013 | Stevens | H04L 61/5007 |
| | | | 709/224 |
| 2017/0345009 A1 | 11/2017 | Unnerstall | |
| 2018/0007084 A1 | 1/2018 | Reddy et al. | |
| 2018/0109554 A1 | 4/2018 | Reddy et al. | |
| 2018/0109555 A1 | 4/2018 | Reddy et al. | |

OTHER PUBLICATIONS

Written Opinion of the International Searching Authority dated Dec. 3, 2019 for corresponding International Application No. PCT/FR2019/052279, filed Sep. 26, 2019.

Reddy T et al., "Distributed Denial-of-Service Open Threat Signaling (DOTS) Signal Channel Specification; draft-ietf-dots-signal-channel-25.txt", Distributed Denial-of-Service Open Threat Signaling (DOTS) Signal Channel Specification; Draft-IETF-DOTS-Signal-Channel-25.Txt; Ineternet-Draft: DOTS, Internet Engineering Task Force, IETF; Standardworkingdraft, Internet Society (ISOC) 4, Rue Des Fala, No. 25, Sep. 6, 2018 (Sep. 6, 2018), pp. 1-90, XP015128447.

First Chinese Office Action dated Sep. 28, 2022 for corresponding Chinese Application No. 201980064096.9.

Linyuan Yao etc., "Distributed Denial of Service Attack Detection based on Object Character in Software Defined Network", vol. 39 No. 2, Feb. 2017, DOI: 10.11999/JEIT160370.

English translation of the Written Opinion of the International Searching Authority dated Jan. 2, 2020 for corresponding International Application No. PCT/FR2019/052279, filed Sep. 26, 2019.

E. Voit et al., "RESTCONF Transport for Event Notifications", draft-ietf-netconf-restconf-notif-07, Sep. 12, 2018.

Reddy T. et al., "Distributed Denial-of-Service Open Threat Signaling (DOTS) Signal Channel Specification", draft-ietf-dots-signal-channel-11, Dec. 18, 2017.

* cited by examiner

METHOD FOR ALLOCATING AN IDENTIFIER TO A CLIENT NODE, METHOD FOR RECORDING AN IDENTIFIER, CORRESPONDING DEVICE, CLIENT NODE, SERVER AND COMPUTER PROGRAMS

CROSS-REFERENCE TO RELATED APPLICATIONS

This Application is a Section 371 National Stage Application of International Application No. PCT/FR2019/052279, filed Sep. 26, 2019, the content of which is incorporated herein by reference in its entirety, and published as WO 2020/065232 on Apr. 2, 2020, not in English.

1. FIELD OF THE INVENTION

The field of the invention is that of communications within a communication network, for example an IP network, and in particular that of added-value IP services.

More specifically, the invention provides a solution for protecting the communication network and the terminals connected to this network against computing attacks.

In particular, the invention provides a solution for allocating a unique identifier to a client node connected to the client domain and for recording this identifier in association with an identifier of the client domain.

In particular, the invention has applications in the field of mitigating Distributed Denial of Service (DDoS) attacks, for example, by implementing, but exclusively, a DDoS Open Threat Signaling (DOTS) architecture, as standardized by the IETF.

2. PRIOR ART AND ITS DISADVANTAGES

As a reminder, a DDoS attack is an attempt to make resources, for example network or computing resources, unavailable to their users. Such attacks can be massively deployed by compromising a large number of hosts, and using these hosts to amplify the attacks.

In order to mitigate these DDoS attacks, DDoS attack detection and mitigation services are offered by some access or service providers to their customers. Such mitigation services (DDoS Protection Services) can be hosted within the infrastructures operated by the access providers or in the cloud. In particular, they make it possible to distinguish between "legitimate" traffic, i.e. data consented to by the user, and "suspicious" traffic.

When a DPS-type service is hosted in the cloud, it is difficult to identify a DDoS attack in advance, because such a service is not present on the routing paths (by default) used to reach the network that is the victim of a DDoS attack.

To solve this problem, it has notably been proposed to set up tunnels to force the traffic (incoming or outgoing) onto a site or network to be inspected by the DPS service. However, this approach significantly increases the latency observed by the users and imposes constraints on the sizing of the DPS service to be able to handle all incoming or outgoing traffic from all the users of the network. In addition, tunnels are potential and proven attack vectors.

When a DPS-type service is hosted within an infrastructure operated by an access provider, even if the DPS service is present in the routing path of incoming or outgoing traffic of a network, difficulties may arise in identifying suspicious traffic. In particular, with the increase in encrypted traffic, especially carried on UDP (for example, QUIC traffic "Quick UDP Internet Connection"), it is difficult to distinguish legitimate traffic from suspicious traffic. The difficulty of accessing plain the text control messages, such as the "SYN/SYN-ACK/ACK" messages provided for in the TCP protocol, can also make the verification of a network node's consent to receive traffic complex.

In order to help identify suspicious traffic, a specific architecture has been standardised by the IETF. Such an architecture, called DOTS, allows a client node, called a DOTS client, to inform a server, called a DOTS server, that it detected a DDoS attack and that appropriate actions are required to counter this attack.

Thus, if a client domain is the target of a DDoS attack, a DOTS client that is part of that client domain can send a message to a DOTS server asking for help. The latter coordinates with a mitigator to ensure that suspicious traffic associated with the denial of service attack is no longer routed to the client domain, while legitimate traffic continues to be routed normally to the client domain. The mitigator can be co-located with the DOTS server.

This solution uses two communication channels between a DOTS client and a DOTS server:
 a DOTS Signal Channel, and
 a DOTS Data Channel.

The DOTS signal channel is used when a DDoS attack is in progress. Thus, a DOTS client can use this channel to request help from a DOTS server. For example, a DOTS client uses this signal channel to send a request to the server informing it that the prefix "1.2.3.0/24" is under a DDoS attack, so that the server can take action to stop the attack. Such a request is associated with a DOTS client identified by a unique identifier, noted for example CUID ("Client Unique IDentifier").

A DOTS server can thus take appropriate action to stop a DDoS attack if the request from the DOTS client does not conflict with other requests from other DOTS clients of the same client domain, or with a filter rule previously installed on the server by another DOTS client of the client domain, and if the server is enabled/configured to honour the last request received. In the event of conflict, the server can send an error message, for example of type 4.09 ("Conflict"), to inform the DOTS client.

Such a signal channel is notably described in the document "*Distributed Denial-of-Service Open Threat Signaling (DOTS) Signal Channel Specification*", draft-ietf-dots-signal-channel, Reddy, T. et al., January 2018.

The DOTS data channel is used when no DDoS attack is in progress. For example, a DOTS client can use this channel to set up filter rules, such as filtering traffic received from certain addresses or traffic destined for a given node. For example, a DOTS client can use this DOTS data channel to ask the server to block all the traffic to the prefix "1.2.3.0/24" or all the UDP traffic destined for the port number 443.

The DOTS server can install filter rules in response to a request from a DOTS client, if that request does not conflict with other requests from other DOTS clients of the same client domain or with an existing filter rule. If there is a conflict with other rules maintained by the DOTS server, the server may send an error message, for example of type 409 ("Conflict"), to inform the DOTS client.

Such a data channel is notably described in the document "*Distributed Denial-of-Service Open Threat Signaling (DOTS) Data Channel*", draft-ietf-dots-data-channel, Boucadair M. et al., December 2017.

According to the procedure described in the two above-mentioned documents, there is a risk that a DOTS server may refuse to process an attack mitigation request sent by a DOTS client when the attack is real, or refuse filtering requests sent by a DOTS client (one purpose of filtering requests being to anticipate DDoS attacks). In particular, such a denial may occur when these filtering requests conflict with filter rules installed by other DOTS clients of the same client domain.

Yet it is impossible for another client node of the same domain to delete these rules and the client node at the origin of the attack mitigation request has no information about the identity of the client node that installed these rules.

It is also possible that these rules may no longer be justified, because they are stale, and that the DOTS client at the origin of these rules did not bother to uninstall them.

In addition, complications can arise if the identifiers used by the DOTS clients of the same domain collide. For example, mitigating a DDoS attack may take longer if the DOTS server detects that the identifier used by the DOTS client at the origin of the mitigation request conflicts with that of another DOTS client of the same client domain.

There is therefore a need for a new technique for improving the reliability and the security of the exchanges between the clients and the DOTS server and thus for implementing an effective protection against computing attacks, particularly denial of service attacks.

3. SUMMARY OF THE INVENTION

According to at least one embodiment, the invention relates to a method for allocating an identifier to a first client node of a client domain, said first client node being able to manage the traffic associated with the client domain in order to protect it against a computing attack, said method comprising:
- receiving a request for allocating a client node identifier from the first client node, said request comprising at least one item of information for identifying the client node;
- obtaining a list of client node identifiers already allocated to the client nodes active at least in the client domain;
- allocating to said first client node a client node identifier not belonging to the list obtained;
- recording in a local memory an association between the allocated identifier and the item of information for identifying the first client node;
- sending a response to the first client node, comprising the allocated identifier; and
- sending a request for recording the identifier allocated to the first client node in the domain to at least one traffic management server associated with the domain.

The invention thus provides a controlled management of the identifiers used by the client nodes of a client domain to communicate with each other and with a traffic management server associated with the client domain. According to this embodiment, it guarantees the uniqueness of the identifier allocated to the first node when it becomes active in the domain and thus avoids identification conflicts between active nodes.

It is noted that the method can be implemented by another client node, benefiting from privileges in the client domain, called a master client, or by a dedicated software instance, called a CMI (CUID Management Instance), that interfaces with the master client node. There may also be one or more servers involved in mitigating computing attacks, for example denial of service attacks, targeting the same client domain.

According to a particular embodiment, upon detection of an event relating to an activity of the client domain, the method comprises a modification of the association recorded in the local memory.

Thus, according to this embodiment, the management of the identifier allocated to the first client node is controlled for the entire period when the node is connected to the client domain.

In particular, the detected event belongs to a group comprising:
- the inactivity of the first client node;
- a suspicious behaviour of the first client node;
- receiving a deletion request received from the first client node; and
- a number of client nodes activated in the domain that is too high compared to a maximum allowed number.

It is noted that the event can concern either a change in the activity of the first client node, or in the security or administration policy of the client domain.

According to a first embodiment, the modification comprises deleting the record, and the method comprises sending a request for cancelling the recording of the allocated identifier to the server.

Thus, this first embodiment makes it possible to apply the deletion of the association (client, cuid) at the server level. The identifier allocated to the first client is thus released and can be assigned to another active client node.

According to a second embodiment, the modification comprises a replacement, in the record of the local memory, of the item of information for identifying the first client with an item of information for identifying a second client of the domain.

Thus, this second embodiment facilitates the replacement of the first client node with a second one, without modifying the mitigation actions installed by the first client node and, consequently, without disrupting the ongoing execution of these mitigation actions. The second client node will resume the processing of the mitigation actions previously implemented by the first client node. According to this example, it is not necessary to apply this modification to the server, since it already stores the correct association between client node unique identifier and domain identifier.

According to a particular embodiment, the received request further comprising a request for allocating a management delegation attribute, said attribute being intended to be specified by another client node in a request for processing a traffic management rule transmitted to the server to delegate to the first client node the management of said traffic management rule, the method comprises:
- allocating a delegation attribute to the first client node, storing the allocated attribute with the association in the record, and the response sent to the first client node comprises the allocated delegation attribute.

According to this embodiment, the delegation attribute can be specified by the first client node when installing a rule (filter, ACL, etc.) after the execution of a mitigation action on the server, to indicate that it grants a delegation on the mitigation action. The delegation attribute is then stored by the server in association with the installed rule. The awareness of this delegation attribute allocated to the first client node can be transmitted to another client node so it can modify the rule installed by the first client node. To do so, the second client node will have to insert the value of this delegation attribute in its request for modifying the concerned rule sent to the server.

For example, the response also comprises the delegation attribute allocated to at least one other client node. In this way, several client nodes of the domain share the same delegation attribute, allowing them to act on a rule installed by another client node when necessary. One advantage of this solution is that it is simple and optimises the protection service.

On the contrary, when the response received from the master client node or the CMI entity does not comprise a delegation attribute, it means that the master client node or the CMI entity wants to disable the delegation procedure, for example because it places an excessive burden on some client nodes of the domain.

In another embodiment, the invention relates to a method for recording an identifier allocated to a client node able to manage the traffic associated with a client domain in order to protection it against a computing attack, implemented in a server, the method comprising:

receiving a recording request from a first client node, said request comprising an identifier of the first client node, said identifier having been allocated to the first client node in accordance with the allocation method as described previously;

obtaining an identifier of the client domain to which the client node belongs; and recording in a memory the identifier of the first client node associated with the identifier of the client domain obtained.

According to this embodiment, the invention proposes to record at the server level an association between the unique identifier allocated to the client node and the identifier of the client domain, which makes it possible to secure the exchanges between the client nodes and the server to manage the traffic associated with the client domain and to guarantee the global uniqueness of the identifier consisting of the pair {CUID, CDID}.

In particular, upon receipt of a request for processing a traffic management rule sent by the client node, said request comprising the identifier of the first client node, the method comprises searching for said record in a memory and rejecting the request if said record is not found.

Thus a malicious client node belonging for example to another client domain can be more easily detected and the request can be rejected if the node is malicious.

According to a particular embodiment, when the processing request comprises a request for modifying a traffic management rule installed by a second client node, the method includes:

verifying a management delegation by comparing a first management delegation attribute specified in the request for modifying the traffic management rule and a second management delegation attribute associated with the traffic management rule installed by the second client node in a record stored in memory;

when the first and second delegation attributes have the same value, modifying the traffic management rule in accordance with the request.

This delegation procedure thus allows the management of a mitigation action to be migrated in case the client node at the origin of its installation is not available. It is particularly interesting, in case of an attack, when a client node previously sent a mitigation request to the server, which responded that there was a conflict between its request and at least one rule already installed by another client node after the execution of a mitigation action. With the invention, the client node that detects the attack can take advantage of the delegation procedure to ask the server to modify the rule so that it no longer impedes the mitigation of the attack in progress. The reliability of the attack mitigation service is therefore increased.

In particular, upon receipt of a request for deleting the identifier record of the first client node, the method comprises deleting said record and deleting the traffic management rules installed by the first client node.

According to a particular embodiment, the method for recording an identifier comprises notifying the other client nodes active in the client domain, prior to said deletion of the traffic management rules installed by the first client node.

It is thus possible to inform the other client nodes of the imminent deletion of rules installed by a client for the mitigation of an attack, and to give them the opportunity to ask the server to migrate them for their benefit.

According to another embodiment, the invention relates to a device for allocating an identifier to a first client node able to manage the traffic associated with a client domain in order to protect it against a computing attack, said device comprising at least one programmable computing machine or one dedicated computing machine configured to implement:

receiving a request for allocating a client node identifier from the first client node, said request comprising at least one item of information for identifying the client node;

obtaining a list of client node identifiers already allocated to client nodes active at least in the client domain;

allocating to the first client node a client node identifier not belonging to the list obtained;

recording in a local memory an association between the allocated identifier and the item of information for identifying the first client node;

sending a response to the first client node, comprising the allocated identifier; and sending a request for recording the identifier allocated to the first client node in the domain to at least one traffic management server associated with the domain.

Other embodiments relate to a corresponding client node and server.

In another embodiment, the invention relates to one or more computer programs comprising instructions for implementing a method according to at least one embodiment of the invention, when this or these programs is/are executed by a processor.

In yet another embodiment, the invention relates to one or more information mediums, irremovable, or partially or totally removable, computer-readable, and comprising instructions from one or more computer programs for implementing a method according to at least one embodiment of the invention.

The methods according to the invention can therefore be implemented in various ways, notably in wired form and/or in software form.

4. LIST OF FIGURES

Other purposes, features and advantages of the invention will become more apparent upon reading the following description, hereby given to serve as an illustrative and non-restrictive example, in relation to the figures, among which:

Figure 7:
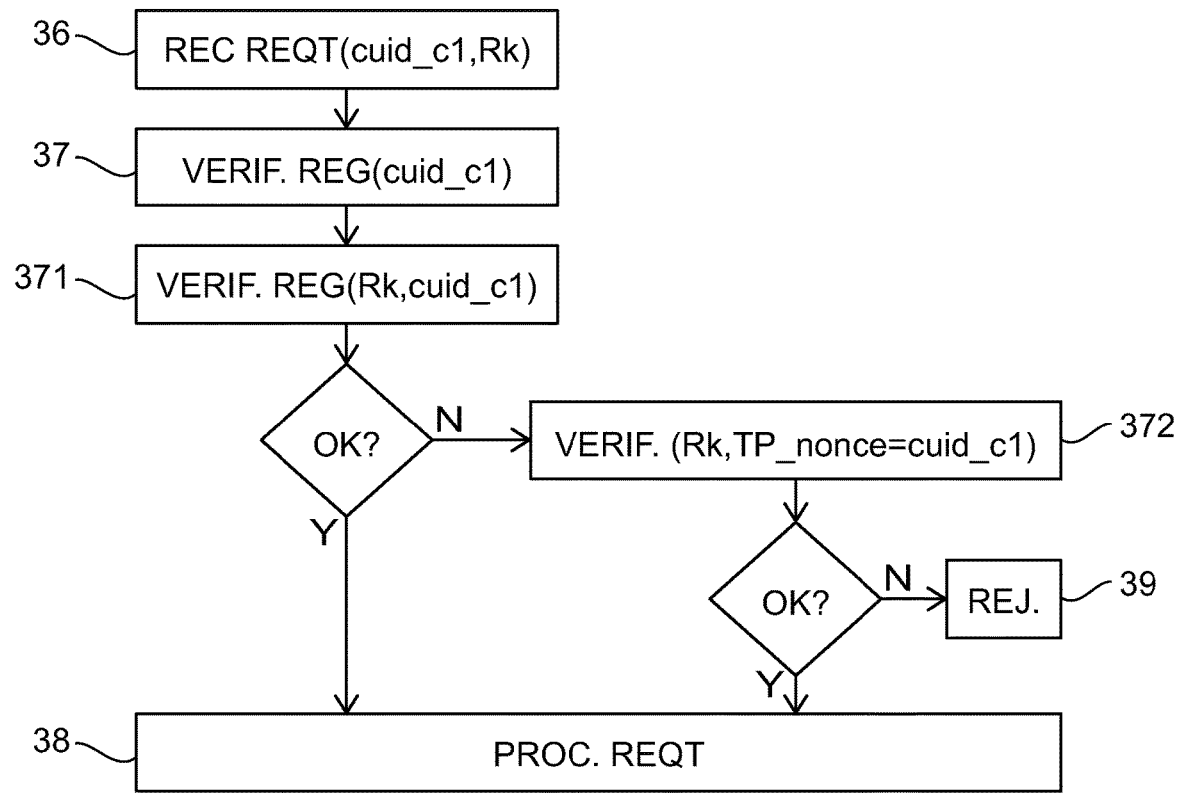
Figure 8A:
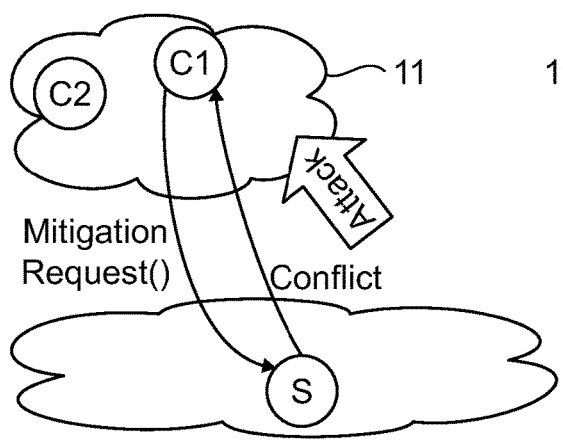
Figure 8C:
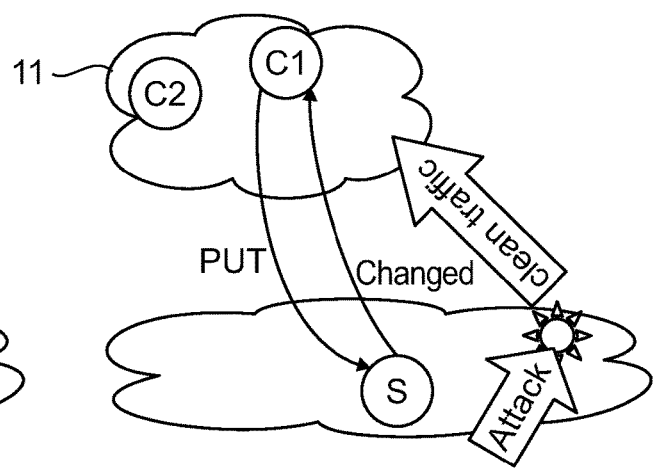
Figure 8B:
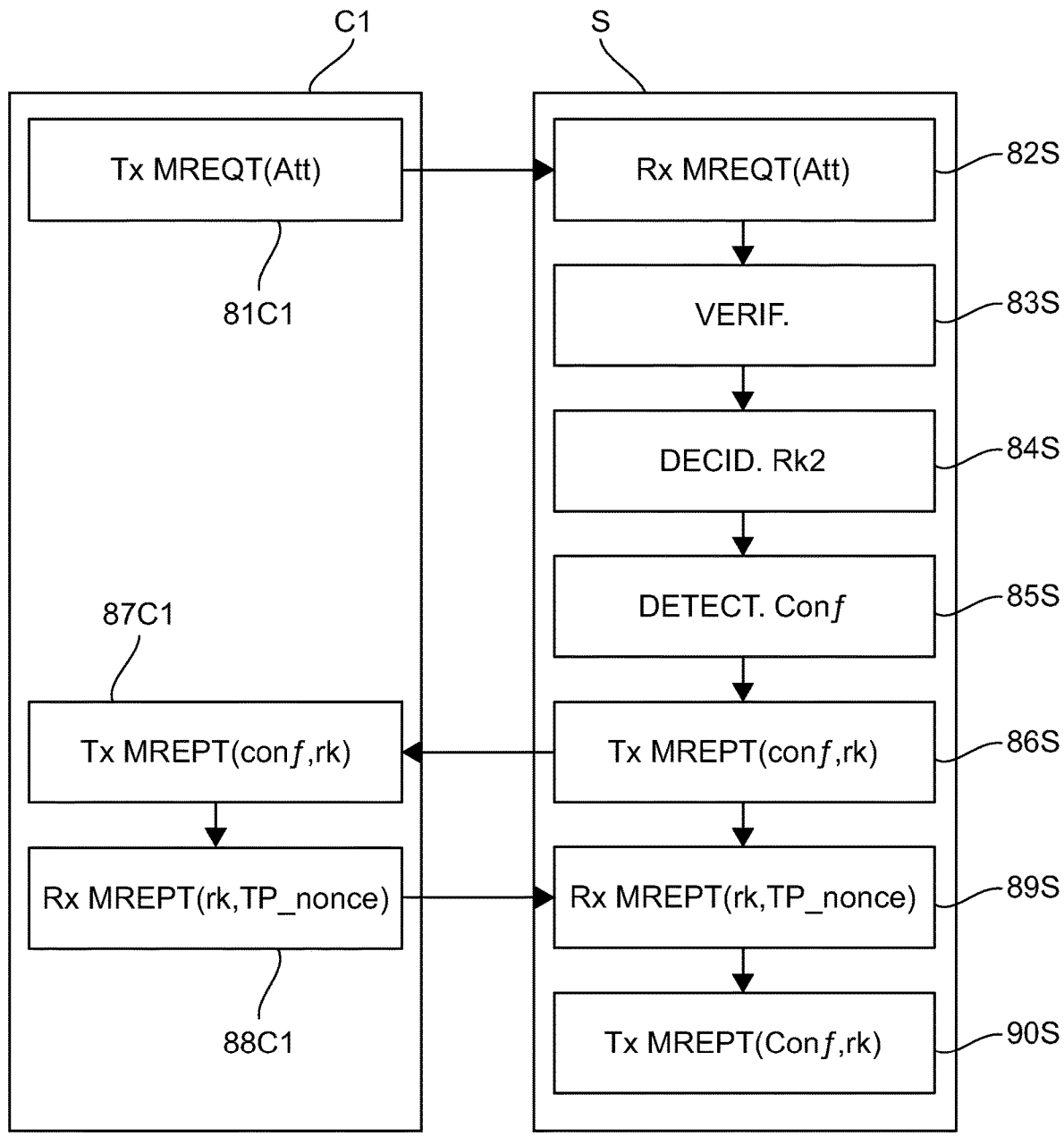
Figure 9A:
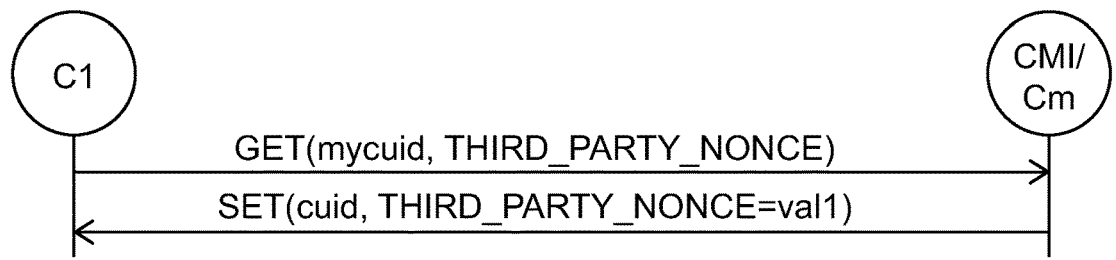
Figure 9B:
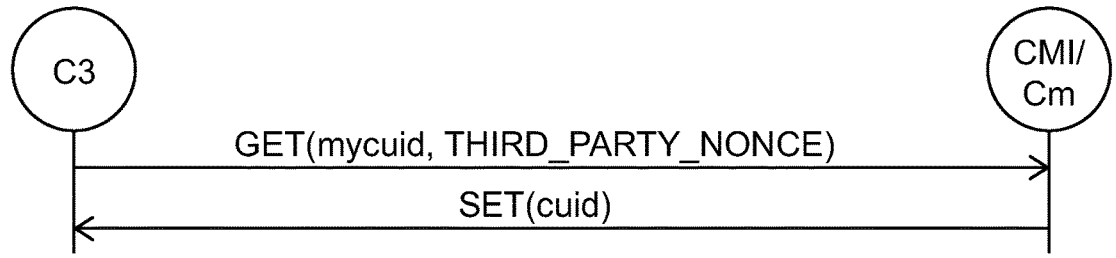
Figure 9C:
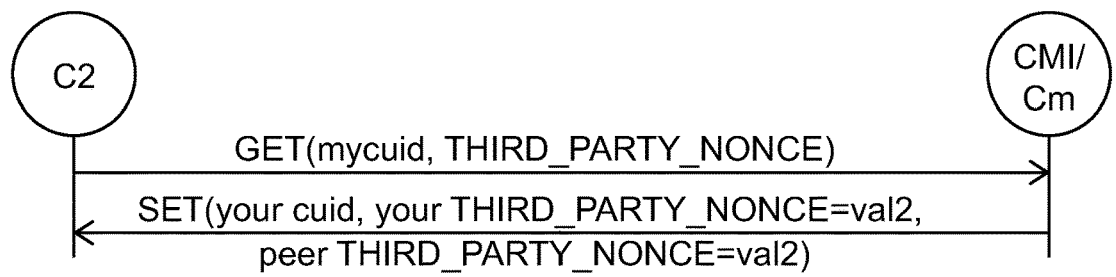
Figure 10:
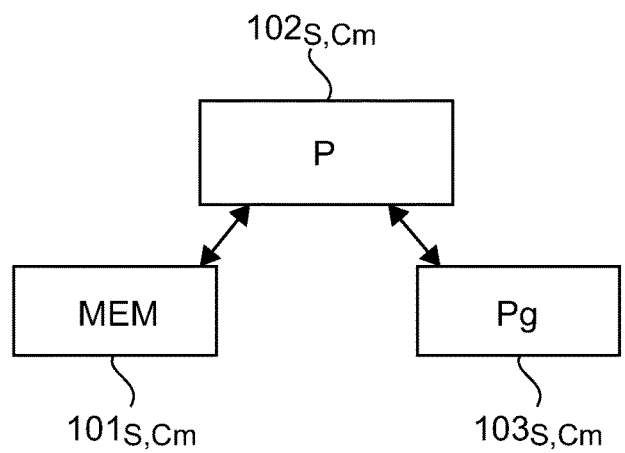

FIG. 7 details the steps implemented by the server to process a modification request by a first client node of a management action installed by a second client node, according to an embodiment of the invention;

FIGS. 8A to 8C illustrate the resolution of a conflict between traffic management actions according to an embodiment of the invention;

FIGS. 9A to 9C illustrate examples of messages exchanged for implementing a delegation procedure between client nodes according to an embodiment of the invention; and FIG. 10 diagrammatically illustrates the hardware structure of a client node and a server according to an embodiment of the invention.

5. DETAILED DESCRIPTION OF THE EMBODIMENTS OF THE INVENTION

The general principle of the invention is based on the allocation of a unique identifier to a client node that is part of a client domain, but also on the recording of this identifier in association with an identifier of the client domain, and on the use of this unique identifier to enhance the efficiency and the reliability of the protection against denial of service attacks within the domain.

Figure 1:
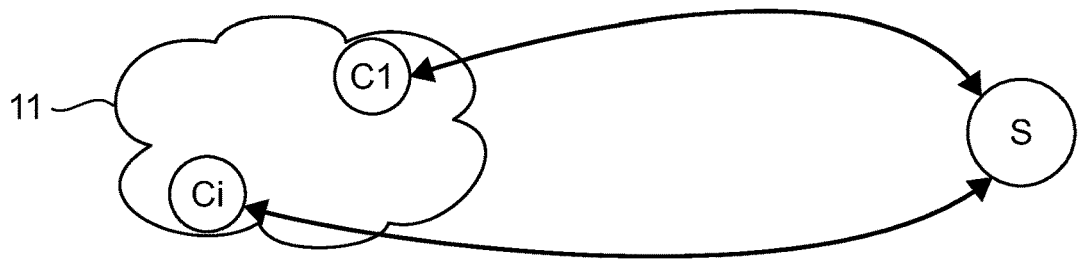
FIG. 1 illustrates an example of a communication network implementing a method for allocating a client node identifier and a method for recording an identifier, according to an embodiment of the invention.

In relation to FIG. 1, different equipment of a network in charge of protecting the network and the terminals connected to it against computing attacks, and implementing a method for allocating an identifier according to an embodiment of the invention is presented.

For example, the client domain 11 contains one or more machines, also called nodes. The term "domain" is used here to refer to a set of machines or nodes under the responsibility of the same entity. For example, several client nodes C1, C2, Cm belonging to the client domain 11, communicating with a server S 12, are considered.

According to the example shown, the server 12 does not belong to the client domain 11. In another example not shown, the server 12 can belong to the client domain 11.

In the remainder of the description, the case of a DOTS-type architecture according to which the client nodes C1, C2 and Cm 114 are DOTS clients and the server S is a DOTS server is considered. The client nodes C1, C2 and Cm and the server S can thus communicate via the DOTS signal and data channels defined in connection with the prior art to inform the server that a DDoS attack was detected and that appropriate actions are required.

5.1. Reminders of DOTS Architecture

A DOTS request can be, for example:

an alias management message, for example to associate an identifier with one or more network resources located in the client domain, a signalling message to request the mitigation of a denial of service attack from a DOTS server, with the server being able, upon receipt of such a message, to initiate the actions necessary to stop the attack, or a traffic management rule management message, filtering for example, comprising requesting a DOTS server to install (or have installed), modify or delete an Access Control List (ACL) for mitigating an attack. In the following, "processing request" designates a request for installing one or more explicit filter rules, an access control list, and more generally any action that a DOTS client node may request from the server for mitigating an attack and more generally, the application of a security policy targeting the domain that hosts the DOTS client.

A DOTS request can be sent from a DOTS client, belonging to a DOTS client domain, to a DOTS server or to a plurality of DOTS servers. A DOTS domain can support one or more DOTS clients. In other words, several client nodes of a client domain can have DOTS functions.

DOTS communications between a client domain and a domain server can be direct, or established via DOTS gateways, not shown. These gateways can be hosted within the client domain, the server domain, or both. In other words, a client node of the client domain can communicate directly with the server, or transmit a request to a gateway of the client domain that communicates directly with the server or with a gateway of the server domain, or transmit a request to a gateway of the server domain that communicates with the server.

A DOTS gateway located in a client domain is considered by a DOTS server as a DOTS client.

A DOTS gateway located in a server domain is considered by a DOTS client as a DOTS server. If there is a DOTS Gateway in a server domain, the authentication of DOTS clients can be entrusted to the DOTS Gateway of the server domain. A DOTS server can be configured with the list of active DOTS gateways within its domain and the server can delegate some of its functions to these trusted gateways. In particular, the server can securely use the information provided by a gateway on a list declared to and maintained by the server by means of an ad hoc authentication procedure (for example, explicit configuration of the list by the authorised administrator of the server, retrieval of the list from an authentication server such as an AAA server (for "Authentication, Authorisation and Accounting"), etc.).

The embodiments presented below can be implemented regardless of the configuration of the DOTS architecture (one or more DOTS clients in a client domain, no DOTS gateway, one or more DOTS gateways of the client domain or in the server domain, client domain separate from the server domain, etc.).

The establishment of a secure DOTS session can be done in accordance with the procedure described in the above-mentioned document "*Distributed Denial-of-Service Open Threat Signaling (DOTS) Signal Channel Specification*".

In the following, it is assumed that the DOTS agents (client(s), server(s)) authenticate each other. There is therefore a secure communication channel, of type DTLS/TLS ((Datagram) Transport Layer Security) for example, between a DOTS client and a DOTS server.

Thus, the messages received from another server spoofing the IP address of the legitimate server can be rejected by a DOTS client. Similarly, the requests from the DOTS clients not authorised to access the mitigation service are ignored by the DOTS server. It is assumed in what follows that this procedure is implemented by the DOTS agents.

The details of the DTLS/TLS exchanges, and those concerning the management of the security keys for the mutual authentication of the DOTS agents, are not the subject of the present invention and are not detailed here.

5.2 Application Examples in the Domain of Mitigation Services (DPS)

Figures 2, 3:
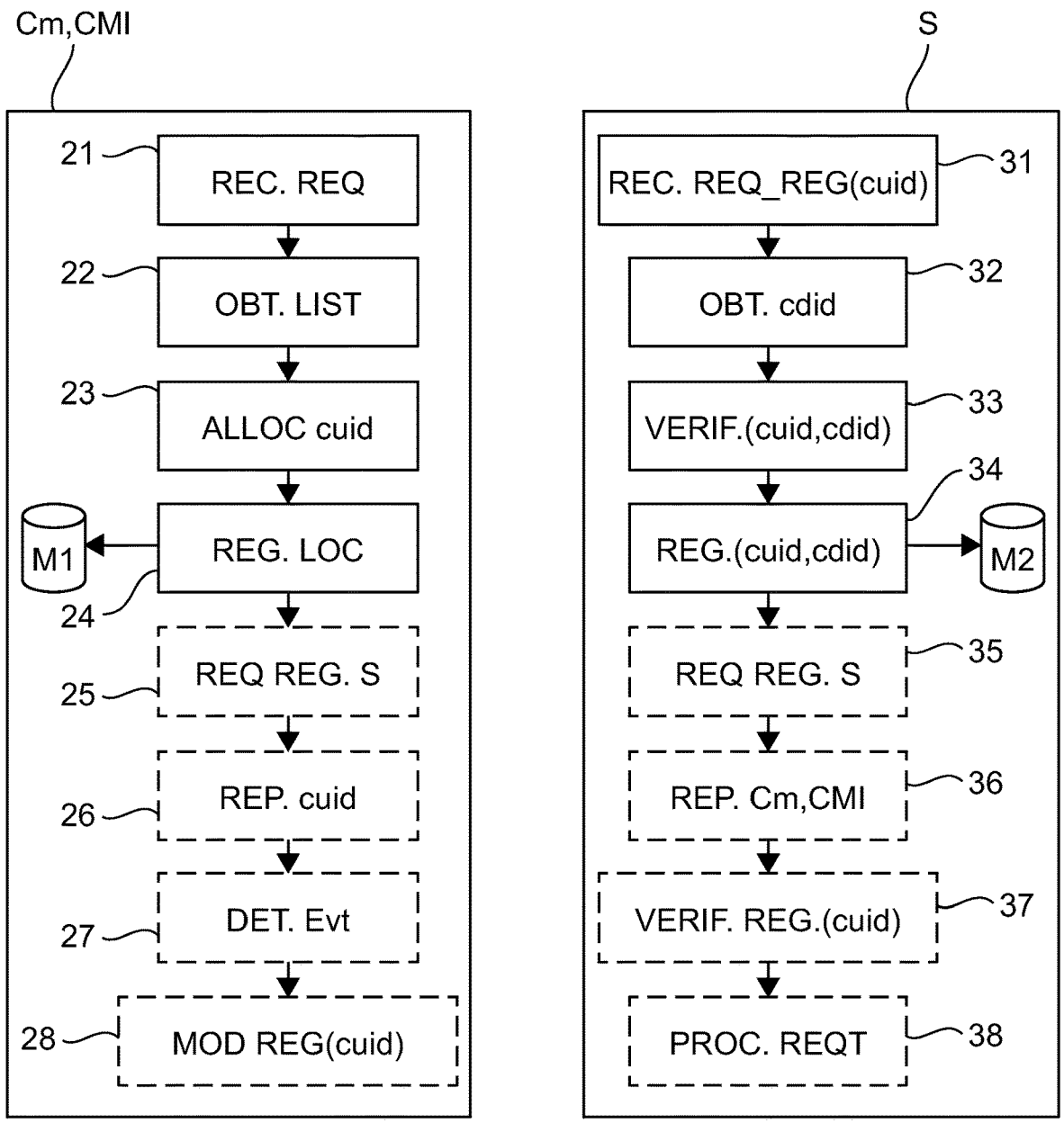
FIG. 2 illustrates the main steps of the method for allocating an identifier according to an embodiment of the invention.
FIG. 3 shows the main steps of the method for recording an identifier according to an embodiment of the invention.

FIG. 2 illustrates the main steps of the method for allocating an identifier to a first client node C1 according to an embodiment of the invention. This method can be implemented by another client node of the client domain, benefiting from privileges on the server S, called a master client Cm, or by a dedicated software instance, called a CMI ("CUID Management Instance"), that interfaces with the master client node C1. In the following, it is assumed that the method for allocating an identifier is implemented by the master client Cm of the client domain 11. However, the same method applies when this function is fulfilled by said dedicated CMI entity.

Figure 4A:
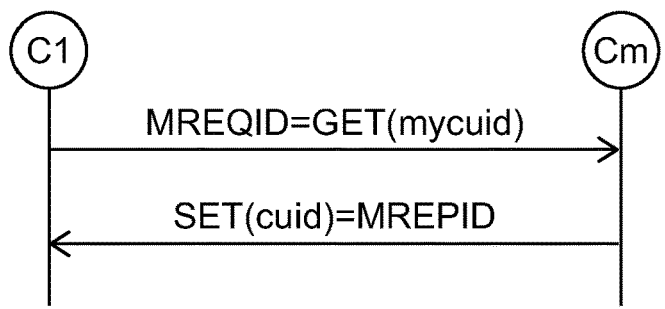
FIGS. 4A and 4B illustrate examples of messages exchanged between a first client node, a master client and a server for allocating an identifier to the first client of a client domain and recording it according to an embodiment of the invention.
Figure 4B:
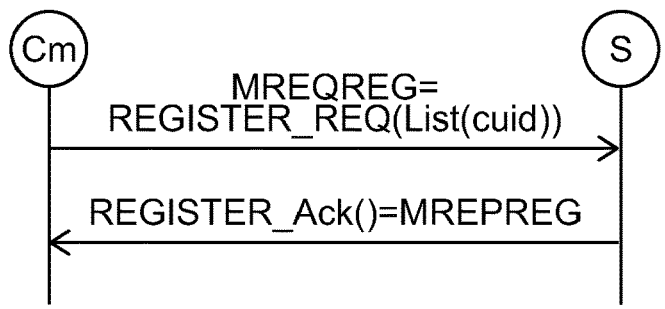

When the DOTS client C1 starts up, it contacts its master client Cm or the CMI instance to request in 21 the allocation of a DOTS client identifier or cuid. To do this, the DOTS client C1 sends an MREQID or GET( ) allocation request message to the master client Cm, as illustrated in FIG. 4A. Upon receipt of the MREQID or GET( ) message by the DOTS master client Cm (or the CMI instance), the latter verifies that this client C1 is authorised to invoke the DOTS service. If necessary, the master client Cm obtains in 22 a list of identifiers currently used in the domain, for example by checking a table stored in memory, and chooses in 23 an identifier cuid_c1 that is not part of this list. In this way, the DOTS client Cm (or the CMI instance) ensures by default that two clients of the client domain do not use the same identifier 'cuid'. It will be noted that this constraint can be released during the phases for securing or replacing a DOTS client with another one. Once the identifier cuid_c1 is chosen, the master client Cm stores in 24 the pair formed by the unique identifier allocated and the identifier of the client C1 in memory, for example a local memory. Then, and in order to improve the robustness of the DOTS service, the DOTS master client Cm contacts in 25 the server S in 27Cm to record the new identifier activated within the DOTS client domain for the client C1. As illustrated in FIG. 4B, it does this, for example, using an MREQREG( ) or REGISTER_REQ( ) recording request message. This message can include the DOTS identifier(s) cuid of the client C1 alone or of multiple clients. Upon receipt of an MREPREG( ) or REGISTER_ACK( ) confirmation message from the server S, it sends in 26 to the client C1 an MREPID or SET (cuid_c1) acknowledgement message comprising the identifier cuid_c1 it allocated to it, as illustrated in FIG. 4A. Upon receipt of a rejection response from the server S, the client Cm can repeat the process in order to reallocate a new identifier to the client C1 and request again the recording of the new identifier cuid_c1 to the server S.

Optionally, upon detection of an event occurring in the client domain, such as the inactivity of the client node C1, or its disconnection, or a change in the security policy of the client domain in 27, it modifies in 28 at least locally the record of the identifier cuid_c1.

In relation to FIG. 3, the steps of a method for recording an identifier allocated to a client node, implemented by the server S according to an embodiment of the invention, are now described. Upon receipt in 31 of an MREQREG( ) or REGISTER_REQ recording request for an identifier cuid_c1 for the client C1 of the client domain 11 from the master client Cm, as illustrated in FIG. 4B, the server S performs the security checks (not shown) already mentioned. In the case of success, it obtains in 32 an identifier 'cdid' (Client Domain IDentifier) of the client domain 11 to which the client C1 is attached. As an example, a DOTS server identifies the DOTS clients belonging to the same domain via the cdid attribute. Other mechanisms for identifying the client domain may be supported by the server. The domain identifier can be calculated locally by the server or communicated by another trusted entity (typically a DOTS relay of its server domain), or both. No assumptions are made about the structure of the cdid. It then checks in 33 whether an association between this client identifier cuid_c1 and this domain identifier 'cdid' is already stored in memory. If it finds one, it rejects the recording request in 35 by returning to the master client an MREPREQ(rej) response. If it does not find one, it processes the recording request in 34 by storing the (cuid, cdid) pair of the client C1 in memory M2. It then acknowledges the recording request with an MREPREG(ack) or REGISTER-ACK( ) message, as illustrated in FIG. 4B.

Optionally, upon receipt in 36 of an MREQT processing request for the implementation of a mitigation solution, such as the installation of a traffic management rule of type traffic filtering Rk, this request originating from a client identified by the identifier cuid_c1, the server checks in 37 that the identifier cuid_c1 is validly recorded in its memory in association with the identifier of the client domain from which the request originates. In the case of success, it processes the request in 38, otherwise it rejects it. It is noted that the verification procedure according to the invention implemented by the DOTS server to process a DOTS request from a DOTS client enhances the reliability of the service even in case of security identity theft by a malicious entity. An example of an extract of a list of DOTS clients as maintained by a master DOTS client Cm is presented in relation to table 1. The table shows three active DOTS clients for this domain. The invention does not imply any particular structure for the tables maintained by the CMI instance/DOTS master client.

TABLE 1

| Client Identifier (cuid) | Client Identity |
|---|---|
| cuid_ex1 | Security Credentials |
| cuid_ex2 | Security Credentials |
| cuid_ex3 | Security Credentials |

It will be noted that in the case where the method according to the invention is implemented by a software entity CMI, the information relating to the allocation of the DOTS client identifier is communicated by the CMI instance to the DOTS master client Cm.

An example of an extract of an MREPREG recording request transmitted by the master client Cm to the server S is presented below. In this example, the PUT request is relayed by a DOTS relay of the server domain. The relay client node inserts the "cdid=here.example" information to communicate to the server the identity of the domain of the DOTS client. This information is notably used by the server to enforce policies such as applying quotas or limiting the number of requests per domain.

Header: PUT (Code=0.03)

Uri-Host: "www.example.com"
Uri-Path: ".well-known"
Uri-Path: "dots"
Uri-Path: "v1"
Uri-Path: "mitigate"
Uri-Path: "cdid= here.example"
Uri-Path: "cuid= cuid_ex1"
Uri-Path: "mid=57956"

In relation to table 2, an example of an extract of a list of clients as maintained by the server S is also presented. The table shows 5 active DOTS clients, 3 of which belonging to the "here.example" domain of the master client Cm.

TABLE 2

| cuid/<br>Client Identifier | Client Identity | Client Domain | ... |
|---|---|---|---|
| cuid_ex1 | Security Credentials | here.example | ... |
| cuid_ex2 | Security Credentials | here.example | ... |
| cuid_ex3 | Security Credentials | here.example | ... |
| cuid_exi | Security Credentials | there.example | ... |
| cuid_exj | Security Credentials | there.example | ... |

Figure 5A:
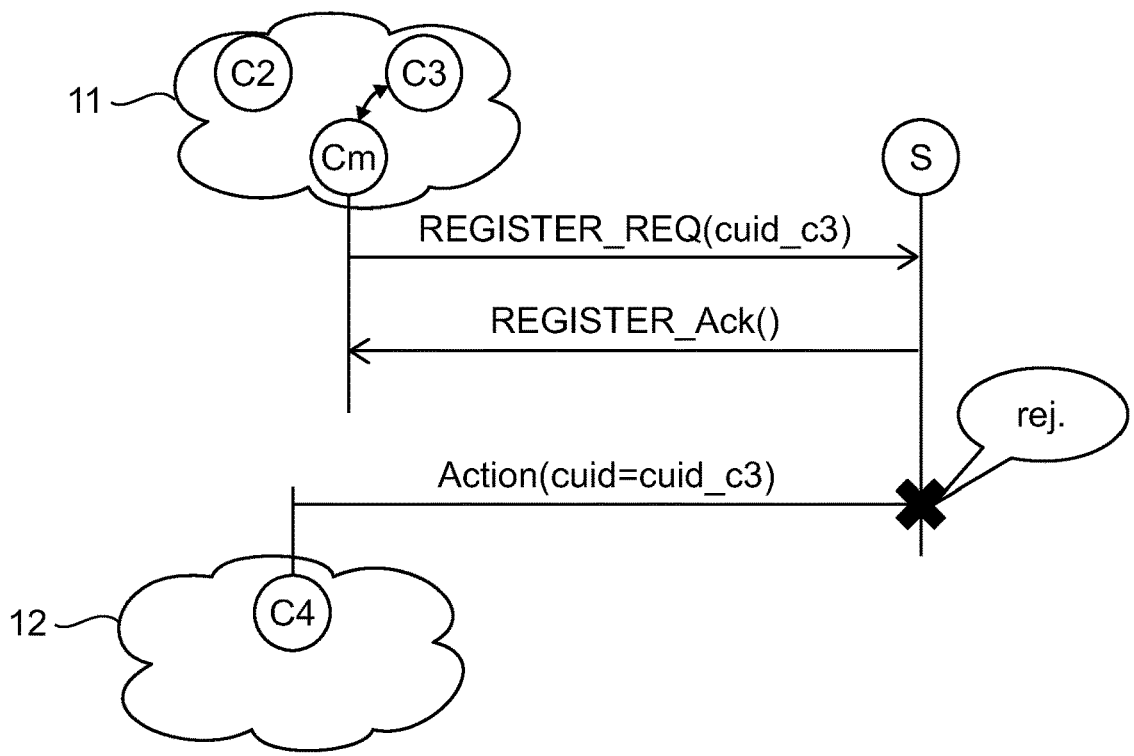
FIGS. 5A and 5B illustrate application examples of the invention to enhance the reliability of the exchanges between the client nodes and the server.
Figure 5B:
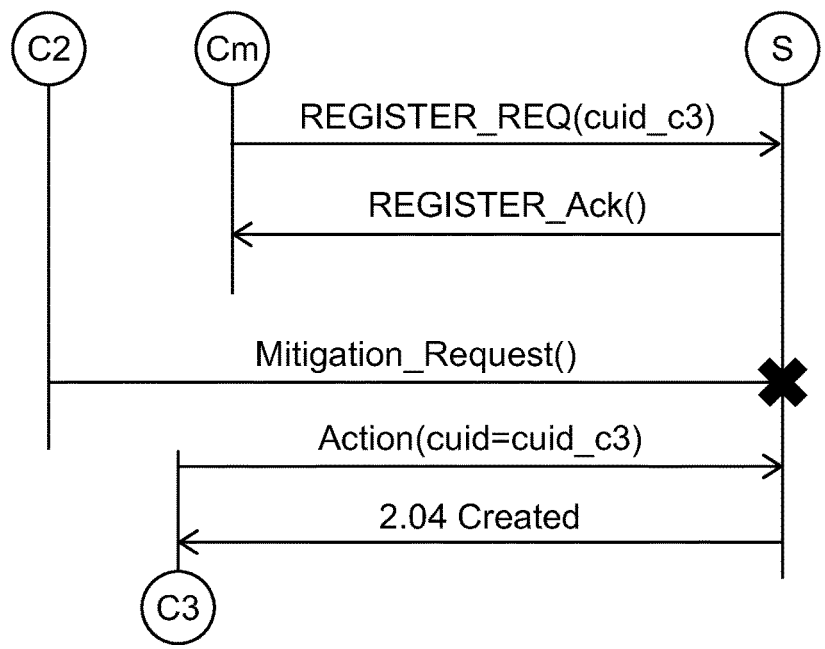

To illustrate the advantages of method for allocating a unique identifier according to the invention, the situation examples in FIGS. 5A and 5B are considered.

In these two examples, the master client C1 first records to the server S the identifier cuid_c3 it allocated to the client C3. As previously described, the server S, upon receipt of the REGISTER_REQ(cuid_c3) request, checks that this identifier is unique in the client domain 11 identified by its unique identifier cdid="here.example" and, if so, stores the (cuid_c3, cdid) association in memory.

In relation to FIG. 5A, if a malicious DOTS client C4 belonging to another domain 12 contacts the server S, requesting the implementation of a management action on behalf of the client C3, i.e. using its identifier cuid_c3, the server detects that the (cuid_c3, cdid) association is incorrect and rejects the request.

In relation to FIG. 5B, if a malicious DOTS client C2 belonging to the same domain 11 as the client C3 and the master client Cm, contacts the server S for an attack mitigation request, its request will be rejected by the server S, because this client C2 is not validly registered with it.

Figure 6A:
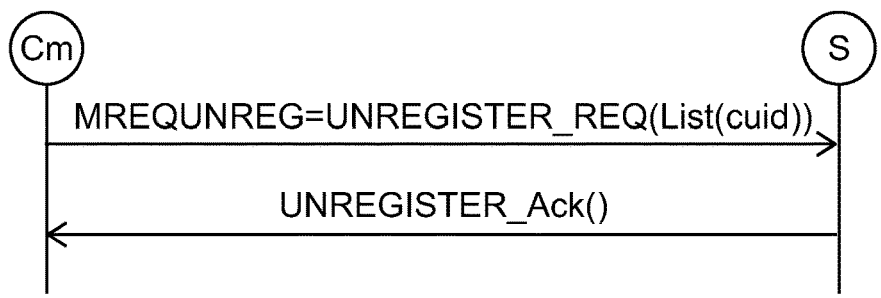
FIGS. 6A to 6D illustrate examples of messages exchanged between the first client node, the master client and the server for deleting the identifier allocated to the first client node according to an embodiment of the invention.
Figure 6B:
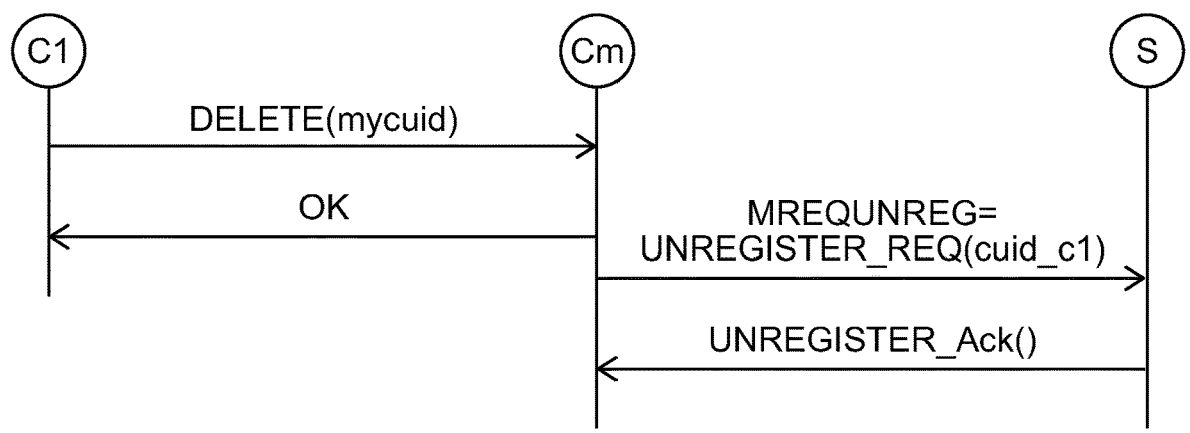
Figure 6C:
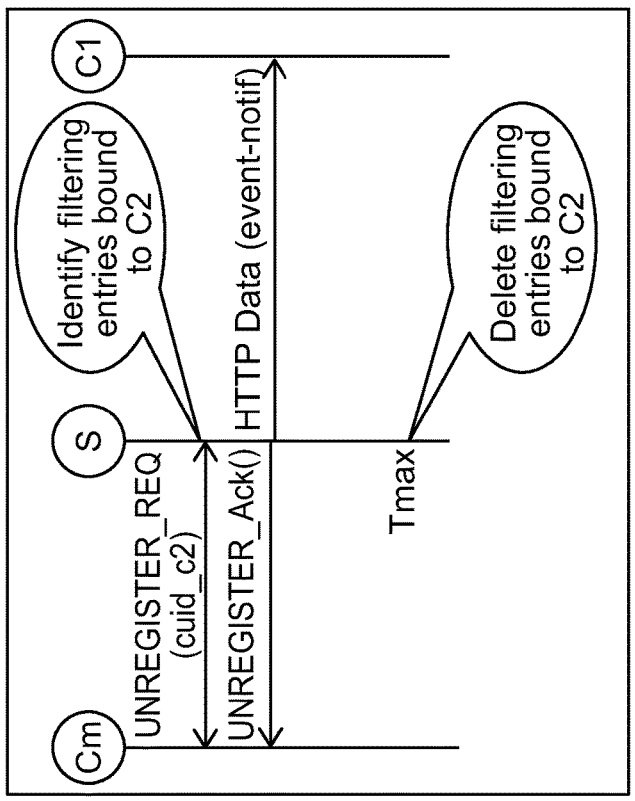

In relation to FIGS. 6A to 6C, the steps 27 for detecting a traffic management event associated with the client domain and 28 for modifying the association of identifiers recorded in the local memory of the master client or the CMI entity, according to a first embodiment of the invention, are now detailed.

It is assumed that the event detected in 27 is an event relating to a change in the activity of the client nodes recorded in the domain or in the security policy applied within the domain. According to the invention, a master client node Cm uses the unique identifiers to react to this event. It is for example:
  the inactivity of a client node for a predetermined period;
  the decision of the client domain administrator to reduce the number of DOTS clients activated within the domain;
  the suspicious behaviour of a DOTS client node;
  the explicit record deletion request from a DOTS client node of the client domain 11.

Following this detection, the master client Cm may decide to delete the record of one or more client nodes with the server S.

To do this, as illustrated in FIG. 6A, it sends an MREQUNREG or UNREGISTER_REQ( ) record deletion request message. The record deletion message can include one or more identifiers of DOTS clients of a client domain. Upon receipt of this message, the DOTS server S deletes the clients listed in its tables (after the usual security checks).

In relation to FIG. 6B, the event detected by the master client Cm is the receipt of an explicit record deletion request from a client node C1 of the client domain. Upon receipt of the MREQSUP( ) or DELETE(cuid_c1) request, the master client Cm modifies the record of the identifier of the client C1.

Figure 6D:
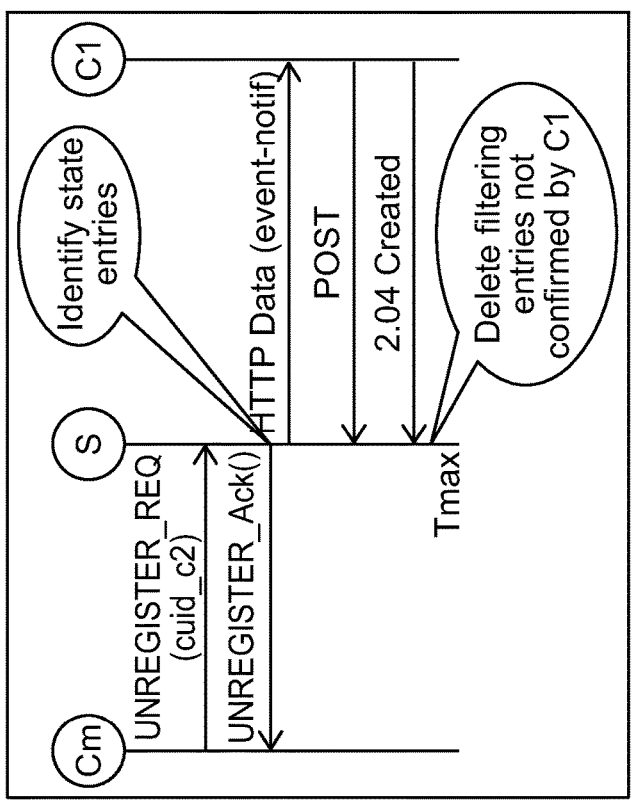
Figure 6D:
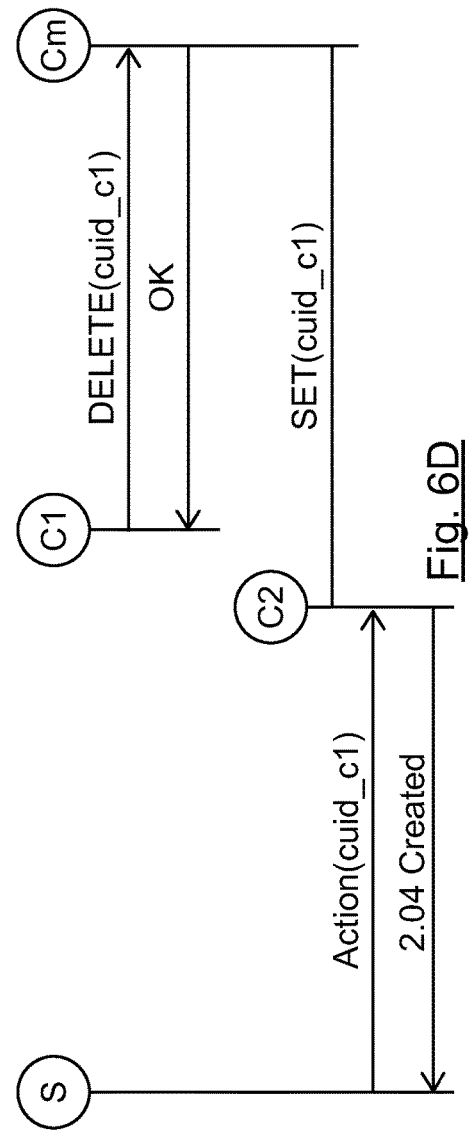

Two options are considered:
  According to a first option, illustrated in FIG. 6B, the master client C1 acknowledges the request of the client C1 with an MREPSUP(ack) response message and transmits an MREQUNREG( ) record deletion request from the client C1 to the server S. The latter deletes the (cuid_c1, cdid) association from its table and responds to the master client Cm with an acknowledgement message. The identifier cuid_c1 is thus released at the server S level, which will then delete the actions installed with this identifier.
  According to a variant illustrated in FIG. 6C, before deleting the traffic management rules installed with the newly released identifier, the DOTS server S informs the other clients of the domain of the existence of these rules, so that they can reinstall them.
In an embodiment, it is assumed that the DOTS agents (clients and servers) support the "RESTCONF and HTTP Transport for Event Notifications" mechanism, as specified in the document "RESTCONF Transport for Event Notifications, draft-ietf-netconf-restconf-notif, E. Voit et al., September 2018".
When the client C2 disconnects or when the server detects an inactivity of the client C2 for a given period, it identifies the filters associated with this C2 client, and then notifies the other client nodes of the same client domain, such as C1, of its intention to delete the traffic management rules associated with the client C2.
Upon receipt of this notification, the client C1 may decide to take responsibility for certain rules initially associated with the client C2. To do this, it transmits a POST type request to the server S to ask it to migrate to its name some rules of the client C2. The server S migrates these rules, and sends an acknowledgement message of type "204 created" to the client C1 (i.e., the identifier of the client node C1 will be maintained by the server as being responsible for the management of these rules).
If no response is received from the other clients of the client domain, the deletion of the filters is confirmed by the server S.
According to a second option, illustrated in FIG. 6D, the master client Cm acknowledges the request of the client C1 with an MREPSUP(ack) response message. To avoid disrupting the operation of the DOTS domain 11, it does not ask the server S to delete the record of the identifier cuid_c1 of the client C1, but it reallocates this identifier to another client C2 of the domain 11. In this way, it replaces the client C1 with another client of the domain without affecting the state maintained by the server S.

When the client C2 sends a processing request, such as the installation of a filter rule to the server S, by identifying itself with the identifier cuid_c1, the server can accept its request because the client C2 is validly identified.

Thus, the allocation of a unique identifier to each client of a client domain performed by the method according to the invention enhances the reliability of the exchanges between the DOTS agents and makes the protection, by the master client Cm located in the client domain 11, of the client domain against the attacks more robust, even in case of disconnection of certain client nodes of the same client domain.

In relation to FIG. 7, the steps 36 to 38 for receiving and processing a request for modifying a traffic management rule implemented by the server S according to a second embodiment of the invention are now detailed.

The server S receives in 36 a processing request for a rule Rk from the client C1.

It checks in 37 that the identifier cuid_c1 is recorded in association with the identifier of the client domain cdid. If necessary, it searches in 371 for a record associating the identifier cuid_c1 with the rule Rk identified by the rk attribute. If this is the case, the client C1 is at the origin of the installation of the rule Rk it wants to modify. The server S performs the requested modification in 38.

Otherwise, it performs in 372 an additional check, that consists in searching for a record associating with the rule Rk the "THIRD_PARTY_NONCE" delegation attribute of the client C1. If it finds it, the server S considers that client C1 benefits from a delegation from the client C2 to modify the rule Rk and performs the requested modification in 38.

Concretely, this new "THIRD_PARTY_NONCE" attribute is specified by the DOTS client C2 when the rule Rk is created on the server S. This attribute includes a unique identifier, such as the identifier cuid_c1 of the client C1.

This delegation procedure allows a client node of the client domain to modify actions installed by another client of that client domain, such as traffic filtering rules that are stale or that conflict with the installation of other filter rules, for example, for implementing a mitigation solution against a DDoS attack.

The implementation of a delegation procedure according to the invention considering the example of the client nodes C1 and C2 of the client domain 11 is now detailed. It is assumed that C1 and C2 activate the delegation procedure for the DOTS operations to enhance the reliability of the service in case one of them is unavailable, in case of conflict, etc. The delegation procedure can be activated in several ways:
- according to a first option, the delegation is activated only by the client C1 to the benefit of the client C2. The client C2 does not designate the client C1 as the recipient of a delegation;
- according to a second option, the delegation is activated by both clients: C1 delegates to C2 and vice versa. Two variants are considered:
  - the same value of the THIRD_PARTY_NONCE attribute is used by both clients.
  - distinct values are used by each of the clients.

For illustration purposes, an example of a request for installing a management action "my_acl", for which the client node C2 identified by the identifier cuid_c2 informs the server that it supports the delegation by indicating the value "263afd79-835c-4ee7-9535-df245cf28d9a" for the THIRD_PARTY_NONCE attribute in its request, is presented below.

```
POST /restconf/data/ietf-dots-data-channel:dots-data\
    /dots-client=cuid_c2 HTTP/1.1
Host: {host}:{port}
Content-Type: application/yang-data+json
{
    "ietf-dots-data-channel:access-lists": {
        "THIRD_PARTY_NONCE": 263afd79-835c-4ee7-9535-
        df245cf28d9a,
        "acl": [
            {
                "name": "my-acl",
                "type": "ipv4-acl-type",
                "aces": {
                    "ace": [
                        {
                            "name": "my-example",
                            "matches": {
                                "l3": {
                                    "ipv4": {
                                        "destination-ipv4-network": "1.2.3.0/24"
                                    }
                                }
                            },
                            "actions": {
                                "forwarding": "accept"
                            }
                        }
                    ]
                }
            }
        ]
    }
}
```

It is now assumed that the client node C1 detects that the machine with the IP address "1.2.3.1/32" is under an attack, as illustrated in FIG. 8A.

In relation to FIG. 8B, the client node C1 solicits the server S so that it implements a mitigation solution for this attack by sending in 81C1 the following message:

```
Header: PUT (Code=0.03)
Uri-Host: "www.example.com"
Uri-Path: ".well-known"
Uri-Path: "dots"
Uri-Path: "v1"
Uri-Path: "mitigate"
Uri-Path: "cuid=cuid_c1"
Uri-Path: "mid=57956"
Content-Format: "application/cbor"
{
    "ietf-dots-signal-channel:mitigation-scope": {
        "scope": [
            {
                "target-prefix": [
                    "1.2.3.1/32",
                ],
                "target-port-range": [
                    {
                        "lower-port": 80
                    }
                ],
                "target-protocol": [
                    6
                ]
            }
        ]
    }
}
```

Upon receipt in 82S of this request, the server S performs in 83S the security and recording checks of the client node C1 already described, then decides in 84S on an action to be implemented. This involves for example installing a new filter rule Rk2. When it tries to install this rule, it detects in 85S a conflict with the filter rule Rk="my_acl" already installed by the client node C2.

It sends in 86S an error message 4.09 (Conflict) to the client node C1 to inform it of the existence of this conflict with the filter rule Rk="my-acl".

The client node C1 receives this error message in 87C1. Contrary to the state of the art, the client node C1 sends back in 88C1 a request for modifying the filter rule Rk to the server S1 to resolve the conflict. In this example, it is assumed that the client node C1 adds a new entry to the existing rule "my-acl" to block only the traffic destined for the address "1.2.3.1/32". For example, the request for modifying Rk it sends to the server S1 takes the following form:

```
PUT /restconf/data/ietf-dots-data-channel:dots-data\
    /dots-client=cuid_c1 HTTP/1.1
Host: {host}:{port}
Content-Type: application/yang-data+json
{
  "ietf-dots-data-channel:access-lists": {
    "THIRD_PARTY_NONCE": 263afd79-835c-4ee7-9535-
    df245cf28d9a,
    "acl": [
      {
        "name": "my-acl",
        "type": "ipv4-acl-type",
        "aces": {
          "ace": [
            {
              "name": "my-example_delegate",
              "matches": {
                "l3": {
                  "ipv4" {
                    "destination-ipv4-network": "1.2.3.1/32"
                  }
                }
              },
              "actions": {
                "forwarding": "drop"
              }
            }
          ]
        }
      }
    ]
  }
}
```

It is noted that it specifies the value of the THIRD_PARTY_NONCE attribute. Upon receipt of this message by the DOTS server S in 89S, the latter checks that the value of the "THIRD_PARTY_NONCE" attribute (263afd79-835c-4ee7-9535-df245cf28d9a) is identical to that indicated by the client C2 when creating the filter rule Rk="my-acl" and that both clients C1 and C2 belong to the same DOTS client domain 11. Following this check, the DOTS server S decides to modify the filter as requested by the client node C1. The DDoS traffic is then blocked as illustrated in FIG. 8C. The invention thus resolves the conflict without soliciting the client node C2.

According to a third embodiment of the invention, the value of the "THIRD_PARTY_NONCE" attribute is allocated by the CMI instance/master client Cm, together with the identifier 'cuid'. The value of the delegation attribute can be obtained by static or dynamic configuration, for example via the DHCP protocol.

In relation to FIG. 9A, the client node C1 transmits an MREQID( ) or GET(cuid, THIRD_PARTY_NONCE) allocation request for an identifier 'cuid_c1' and a delegation attribute.

Advantageously, the CMI instance or the master client node Cm can disable this delegation procedure by not returning any delegation attribute value to the client C1 as illustrated in FIG. 9B. Concretely, the absence of the THIRD_PARTY_NONCE attribute in the response received from the CMI is an explicit indication to inform the client node C1 that the DOTS delegation procedure is disabled.

Indeed, the delegation procedure can induce a computing overload for the client node that takes over from another client node for managing its ongoing actions. If the load of said relay node reaches a certain threshold, for example 80% of the CPU (Central Processing Unit), then the delegation procedure could be disabled. The entity in charge of enabling the delegation procedure can notably be informed of a threshold overrun by conventional notification means such as an "SN MP trap".

According to an embodiment variant, illustrated in FIG. 9C, the master client node indicates in its response to the client node C1, not only the value of the delegation attribute it allocated to it, but also the one it allocated to the other client nodes of the same client domain. It is understood that in this case, all the client nodes of the client domain share the same delegation attribute value.

Thus, as illustrated by the different embodiments of the invention that have just been described, the recording by the server S of an association between the unique identifier allocated to the client node by the master client node or the CMI entity, and the identifier of the client domain 11, not only enhances the reliability of the exchanges between the DOTS agents, but also makes the protection implemented by the server S against DDoS attacks easier and more robust.

5.3 Structures

Finally, a description is given, in relation to FIG. 10, of the simplified structures of a client node and a server according to one of the embodiments described above.

According to one particular embodiment, a client node Cm comprises a memory $101_{Cm}$ comprising a buffer memory, a processing unit $102_{Cm}$, equipped for example with a programmable computing machine or a dedicated computing machine, for example a processor P, and controlled by the computer program $103_{Cm}$, implementing steps of the method for allocating an identifier to a first client node in charge of managing the traffic associated with a client domain according to an embodiment of the invention.

At initialisation, the code instructions of the computer program $103_{Cm}$ are for example loaded into a RAM memory before being executed by the processor of the processing unit $102_{Cm}$.

The processor of the processing unit $102_{Cm}$ implements steps of the identifier allocation method previously described, according to the instructions of the computer program $103_{Cm}$, to:

receive a request for allocating a client node identifier from the first client node, said request comprising at least one item of information for identifying the client node;

obtain a list of client node identifiers already allocated to the client nodes active at least in the client domain;

allocate to said first client node a client node identifier not belonging to the list obtained;

record in a local memory an association between the allocated identifier and the item of information for identifying the first client node;

send a response to the first client node, comprising the allocated identifier; and send a request for recording the identifier allocated to the first client node in the domain to at least one traffic management server associated with the domain.

According to one particular embodiment, a server S comprises a memory 101s comprising a buffer memory, a processing unit 102s, equipped for example with a programmable computing machine or a dedicated computing machine, for example a processor P, and controlled by the computer program 103s, implementing steps of the method for recording an identifier according to an embodiment of the invention.

At initialisation, the code instructions of the computer program 103s are for example loaded into a RAM memory before being executed by the processor of the processing unit 102s.

The processor of the processing unit 102s implements steps of the identifier recording method previously described, according to the instructions of the computer program 103s, to:
receive a recording request from a first client node, said request comprising an identifier of the first client node, said identifier having been allocated to the first client node by the client node Cm according to the invention;
obtain an identifier of the client domain to which the client node belongs;
record in a memory the identifier of the first client node associated with the identifier of the client domain obtained.

The invention claimed is:

1. A method for allocating an identifier to a first client node of a client domain, at least one traffic management server being associated with the client domain, the method being implemented by an allocation device and comprising:
receiving a request from the first client node for allocating a client node identifier to the first client node, the request comprising at least one item of information for identifying the first client node and the first client node being able to manage the traffic associated with the client domain in order to protect the client domain against a computing attack;
obtaining a list of client node identifiers already allocated to client nodes active at least in the client domain;
allocating to the first client node a client node identifier not belonging to the list obtained;
recording in a local memory an association between the allocated client node identifier and the item of information for identifying the first client node;
sending a response to the first client node, comprising the allocated client node identifier; and
sending to the at least one traffic management server a request for recording in association with the domain the client node identifier allocated to the first client node in the domain.

2. The method according to claim 1, wherein, upon detection of an event relating to an activity of the client domain, the method comprises a modification of the association recorded in the local memory.

3. The method according to claim 2, wherein the detected event belongs to a group consisting of:
the inactivity of the first client node;
a suspicious behaviour of the first client node;
receiving a deletion request received from the first client node; and
a number of client nodes activated in the domain that is too high compared to a maximum allowed number.

4. The method according to claim 2, wherein the modification comprises deleting the record, and the method comprises sending a request for cancelling the recording of the allocated identifier to the server.

5. The method according to claim 2, wherein the modification comprises a replacement, in the record of the local memory, of the item of information for identifying the first client node with an item of information for identifying a second client of the domain.

6. The method according to claim 1, wherein, the received request further comprises a request for allocating a management delegation attribute, the attribute being intended to be specified by another client node in a request for processing a traffic management rule transmitted to the server to delegate to the first client node the management of the traffic management rule, and the method comprises:
allocating a delegation attribute to the first client node,
storing the allocated attribute with the association in the record,
and wherein the response sent to the first client node comprises the allocated delegation attribute.

7. A method for recording an identifier allocated to a client node, the method being implemented in a traffic management server, the method comprising:
receiving a request for recording a first client node, the request comprising an identifier of the first client node, the first client node being able to manage the traffic associated with a client domain in order to protect the client domain against a computing attack;
obtaining an identifier of the client domain to which the first client node belongs; and
recording in a memory the identifier of the first client node in a record associated with the identifier of the client domain obtained.

8. The method according to claim 7, wherein, upon receipt of a request for processing a traffic management rule sent by the client node, the request comprising the identifier of the first client node, the method comprises the at least one traffic management server searching for the record in the memory and rejecting the request if the record is not found.

9. The method according to claim 8, wherein, when the request for processing comprises a request for modifying a traffic management rule installed by a second client node, and the method comprises the server:
verifying a management delegation by comparing a first management delegation attribute specified in the request for modifying the traffic management rule and a second management delegation attribute associated with the traffic management rule installed by the second client node in a record stored in the memory;
when the first and second delegation attributes have the same value, modifying the traffic management rule in accordance with the request.

10. The method according to claim 7, wherein the method further comprises, upon receipt of a request for deleting the identifier record of the first client node, the server deleting the record and deleting traffic management rules installed by the first client node.

11. The method according to claim 10, wherein the method comprises the server notifying the other client nodes active in the client domain, prior to the deletion of the traffic management rules installed by the first client node.

12. A device for allocating an identifier to a first client node of a client domain, at least one traffic management server being associated with the client domain, the device comprising memory, and at least one programmable computing machine or one dedicated computing machine configured to implement: receiving a request from the first client node for allocating a client node identifier from to the first client node, the request comprising at least one item of information for identifying the first client node and the first client node being able to manage the traffic associated with the client domain in order to protect the client domain against a computing attack; obtaining a list of client node identifiers already allocated to client nodes active at least in the client domain; allocating to the first client node a client node identifier not belonging to the list obtained; recording in a local memory an association between the allocated client node identifier and the item of information for identifying the first client node; sending a response to the first client node, comprising the allocated client node identifier; and sending to the at least one traffic management server a request for recording in association with the domain the client node identifier allocated to the first client node in the domain.

13. A client node comprising:
a device for allocating an identifier to a first client node of a client domain, at least one traffic management server being associated with the client domain, the device comprising at least one programmable computing machine or at least one dedicated computing machine configured to implement:
receiving a request form the first client node for allocating a client node identifier to the first client node, the request comprising at least one item of information for identifying the first client node and the first client node being able to manage the traffic associated with the client domain in order to protect the client domain against a computing attack;
obtaining a list of client node identifiers already allocated to client nodes active at least in the client domain;
allocating to the first client node a client node identifier not belonging to the list obtained;
recording in a local memory an association between the allocated client node identifier and the item of information for identifying the first client node;
sending a response to the first client node, comprising the allocated client node identifier; and
sending to the at least one traffic management server a request for recording in association with the domain the client node identifier allocated to the first client node in the domain.

14. A server comprising memory, and at least one programmable computing machine or one dedicated computing machine configured to manage the traffic associated with a client domain in order to protect the client domain against a computing attack, implementing:

receiving a recording request from a first client node, said request comprising an identifier of the first client node, the first client node being able to manage the traffic associated with a client domain in order to protect the client domain against a computing attack;
obtaining an identifier of the client domain to which the client node belongs; and
recording in a memory the identifier of the first client node associated with the identifier of the client domain obtained.

15. A non-transitory computer-readable medium comprising a computer program product stored thereon comprising program code instructions for implementing a method for allocating an identifier to a first client node of a client domain, when the instructions are executed by a processor of an allocation device, at least one traffic management server being associated with the client domain, wherein the instructions configure the allocation device to:
receive a request from the first client node for allocating a client node identifier to the first client node, the request comprising at least one item of information for identifying the first client node and the first client node being able to manage the traffic associated with the client domain in order to protect the client domain against a computing attack;
obtain a list of client node identifiers already allocated to client nodes active at least in the client domain;
allocate to the first client node a client node identifier not belonging to the list obtained;
record in a local memory an association between the allocated client node identifier and the item of information for identifying the first client node;
send a response to the first client node, comprising the allocated client node identifier; and
send to the at least one traffic management server a request for recording in association with the domain the client node identifier allocated to the first client node in the domain.

16. The method according to claim 1, wherein the list of client node identifiers comprises all client node identifiers already allocated to client nodes active at least in the client domain.

17. The method according to claim 16, wherein the list of client node identifiers is stored in a local memory of the allocation device.

* * * * *